United States Patent Office 3,477,439
Patented Nov. 11, 1969

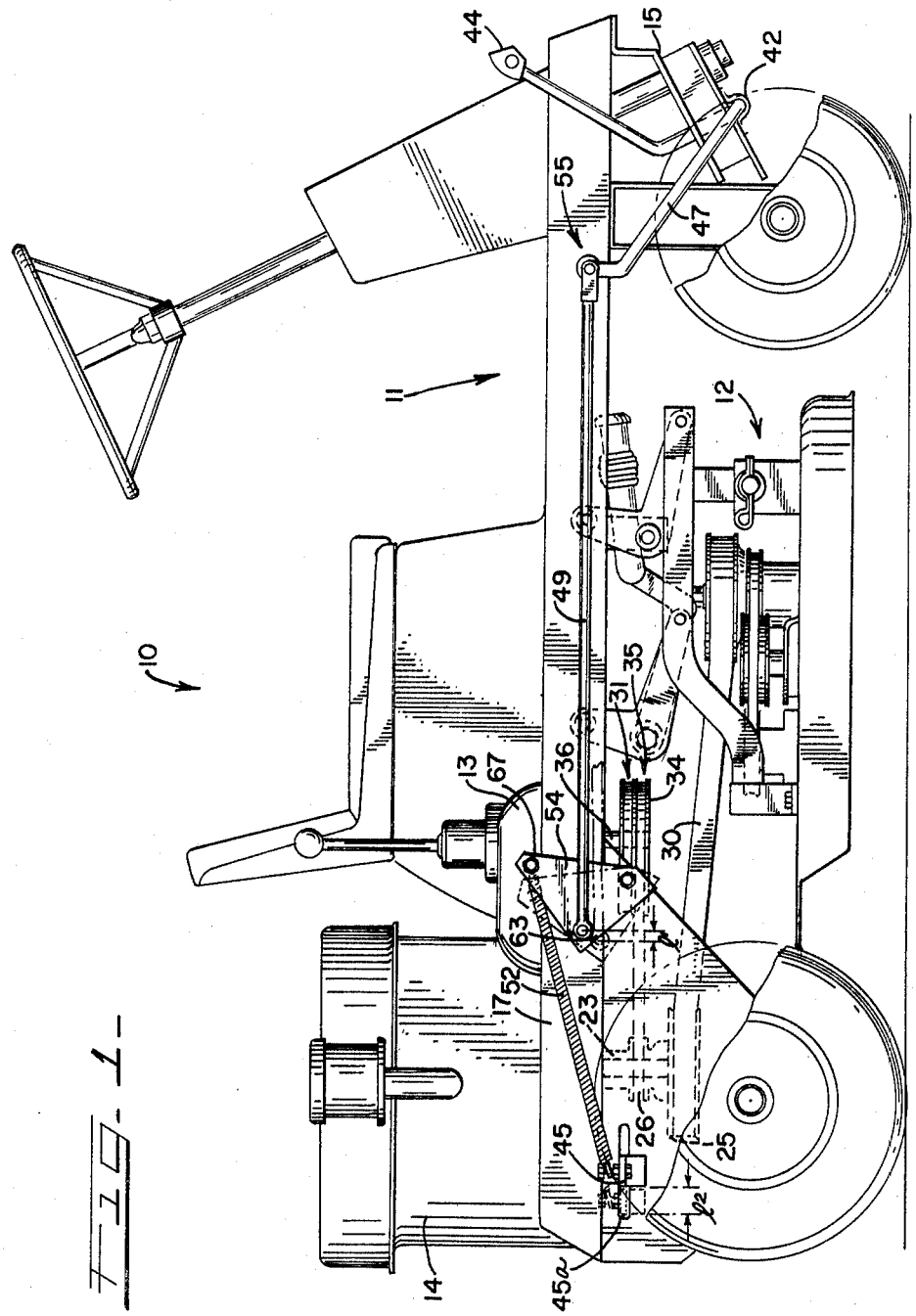

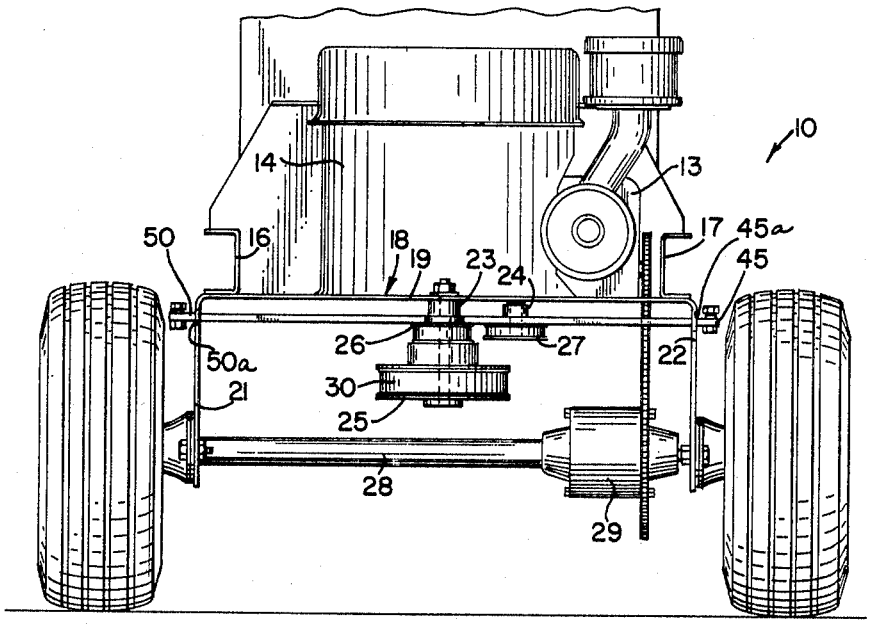
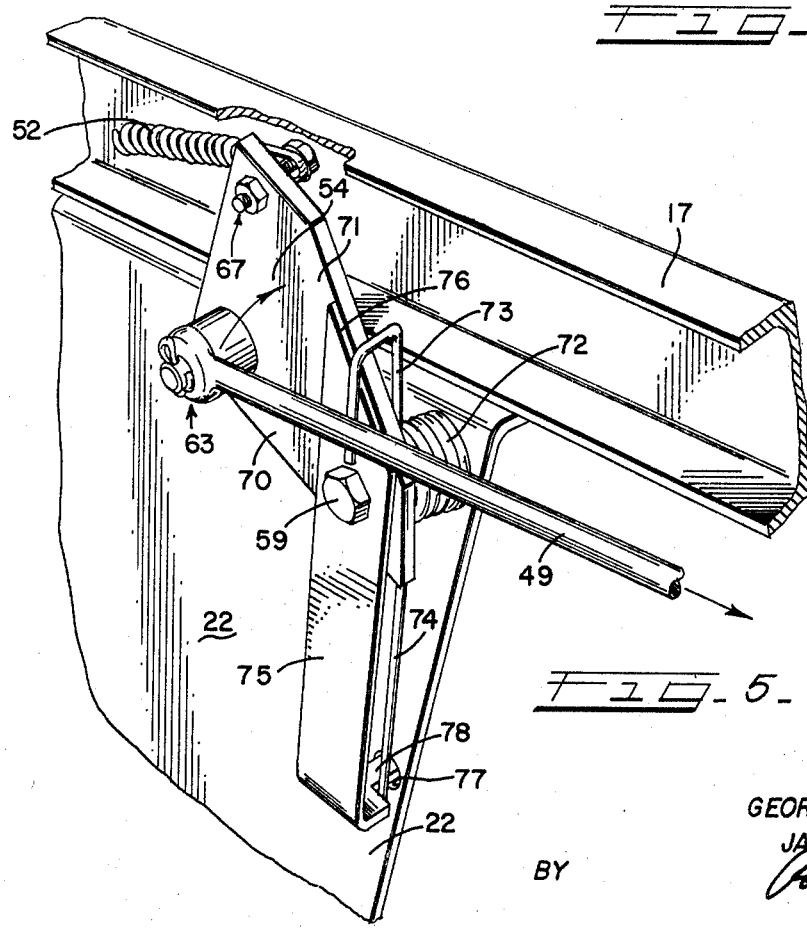

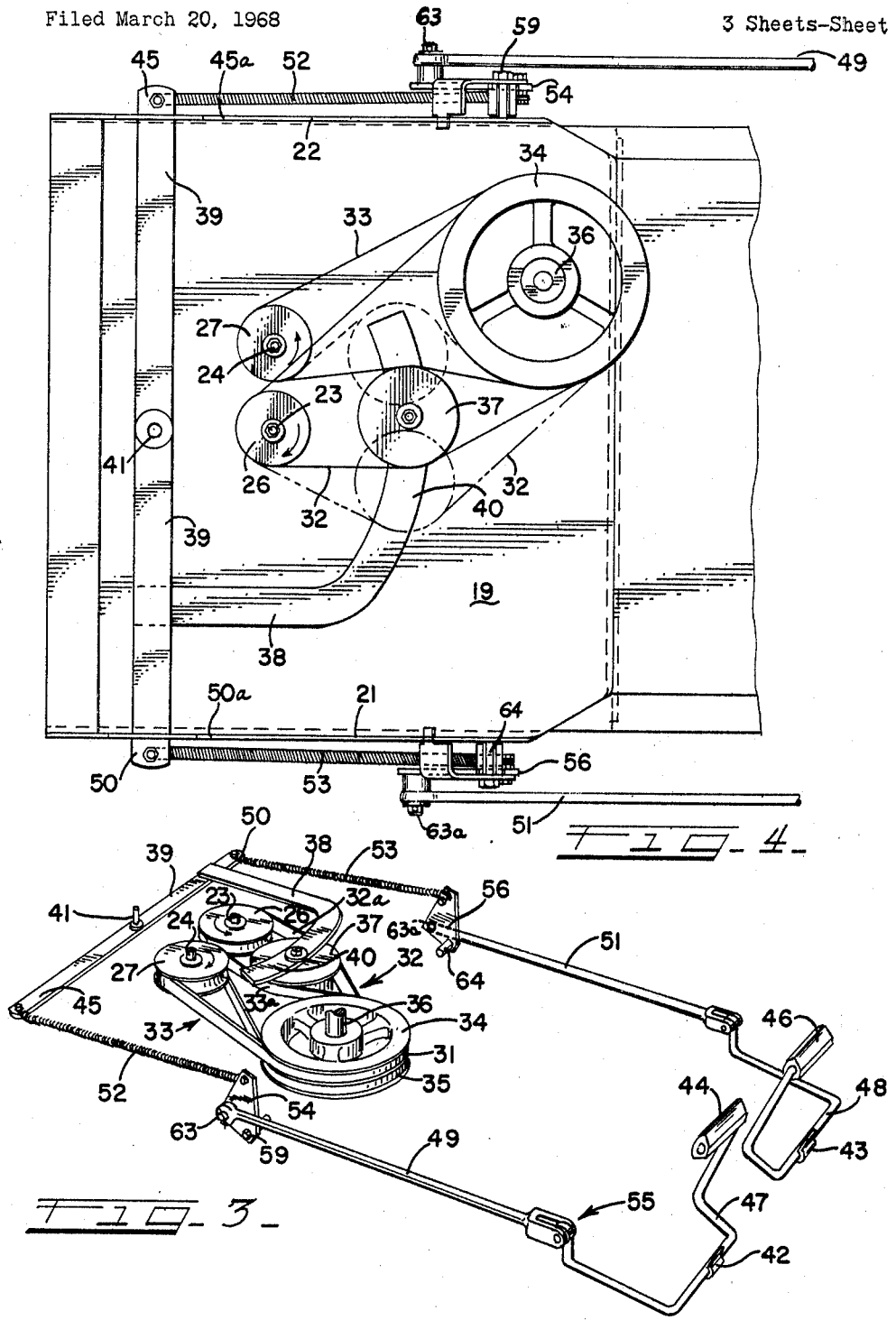

3,477,439
RIDING MOWER WITH FORWARD AND REVERSE BELT DRIVE
George J. Hamouz, Clarendon Hills, and James W. Zurek, Berkeley, Ill., assignors to International Harvester Company, Chicago, Ill., a corporation of Delaware
Filed Mar. 20, 1968, Ser. No. 714,698
Int. Cl. B60k *17/00;* F16h *9/00*
U.S. Cl. 180—70                                  9 Claims

ABSTRACT OF THE DISCLOSURE

A self-propelled riding lawn mower having lawn cutting means, power means, and a control system for determining the direction of travel of the mower. The control system includes a pair of pedals, a forward belt drive, a reverse belt drive, and an idler pulley movable to selectively engage the forward or reverse belt drives in response to actuation of the pedals.

Background and summary of the invention

This invention relates generally to a self-propelled, riding lawn mower and more particularly to a control system for engaging and disengaging the drive means for such a lawn mower.

An important feature of riding lawn mowers of the type designed for residential use is its maneuverability because of the confined areas in which the machine is used. Maneuverability contemplates not only the turning radius of the vehicle but also the ease at which the direction of travel may be reversed. Conventionally, direction control is provided by a transmission having lever actuable forward and reverse gears. In selecting a forward or reverse direction of travel the operator is required to manually move the transmission lever to one of the proper operating positions. This not only distracts his attention but also is time consuming requiring at least momentary pauses during shifting. Another conventional control system used in combination with belt drive provides an actuator lever, the relative angular displacement of which determines the direction of travel of the vehicle. This particular type of controls require the constant attention of the operator to avoid overshifting of the lever which could produce a direction of travel opposite that desired.

The present invention contemplates the use of a pair of controls selectively actuable by a pair of foot pedals—one pedal for forward and the other for reverse. The pedals are cooperatively connected to a belt drive means for powering the driving wheels of the vehicle. In the embodiment of the invention as presented herein, the belt drive is normally inactive. Actuation of the forward drive pedal activates a forward drive belt and similarly actuation of the reverse drive pedal activates a reverse drive belt. The pedals are conveniently located relative to the operator so that they may be actuated by touch alone.

An object of such a control system is to provide a control for selectively determining the direction of travel of a lawn mower. Such controls may be actuated by touch while the operator directs his attention to steering the vehicle. This feature improves the safety of the riding lawn mower.

Another object is to provide controls for instantly reversing the direction of travel of the mower thereby increasing its maneuverability.

These and other objects will become apparent to those skilled in the art from the following disclosure taken in conjunction with the attached drawings.

Drawings

FIGURE 1 is a side elevational view of a riding lawn mower incorporating features of the present invention;

FIGURE 2 is a rear view of the lawn mower shown in FIGURE 1 with portions cut away for convenience of illustration;

FIGURE 3 is a perspective view of the control system used in the lawn mower shown in FIGURE 1 and shown detached from the other parts of the mower;

FIGURE 4 is a bottom plan view of a portion of the control system shown in FIGURE 3; and FIGURE 5 is a perspective view showing details of a portion of the control system shown in FIGURE 3.

Description of the preferred embodiment

With reference to FIGURES 1 and 2, a lawn mower 10 incorporating features of the present invention is seen to comprise a chassis 11, a rotary mower attachment shown generally as 12, a power transmission 13, and an engine 14. The chassis 11 includes a pair of spaced channels 16 and 17 having their front ends interconnected by a cross member 15 and their rear ends interconnected by a frame member 18. The frame member 18 provides a horizontal platform 19 for supporting the engine 14 and the transmission 13. The frame 18 includes a pair of sidewalls 21 and 22 which are supported at spaced intervals by a rear axle 28. Extending vertically through suitable openings in the platform 19 are the engine driveshaft 23 and camshaft 24. The driveshaft 23 carries a pair of stacked pulleys 25 and 26 and the camshaft 24 carries a pulley 27. As indicated in FIGURE 1, power is delivered to the rotary mower 12 from the eengine driveshaft 23 through a belt drive comprising pulley 25, V-belt 30, and a mower pulley.

The rear axle 28 is drivingly connected to the transmission 13 by a conventional differential 29 and a chain and sprocket drive. Input power to the transmission 13 is through the belt drive means to be described presently. The transmission 13 has an input shaft 36 extending downwardly through platform 19. A pulley 34 is secured to shaft 36 and has a pair of grooves 31 and 35 placed in horizontal alignment with pulleys 26 and 27, respectively.

As best seen in FIGURE 3 a V-belt 32 trained about the pulley 26 and the pulley 34 (groove 35) provides a forward drive for transmitting power from the driveshaft 23 to the transmission input shaft 36. Likewise a V-belt 33 trained about the camshaft pulley 27 and the transmission pulley 34 (groove 31) provides means for transmitting power from the camshaft 24 to the input transmission shaft 36. Now since the shafts 23 and 24 are counter-rotating, it will be appreciated that selective tensioning of either belt 32 or 33 will drive the input shaft 36 in either a forward or a reverse direction. In this embodiment the belt drive assembly has been arranged so that the driveshaft 23 propels the vehicle 10 in a forward direction and the camshaft 24 propels the vehicle 10 in a reverse direction. An idler pulley 37 is interposed between corresponding runs 32a and 33a of the V-belts 32 and 33, respectively. Movement of the pulley 37 towards run 32a increases the tension of belt 32 thereby transmitting power from the driveshaft 23 to the input shaft 36; and movement of the pulley 37 towards run 33a increases the tension in belt 33 thereby transmitting power from the camshaft 24 to the input shaft 36.

The movement of the pulley 37 in either of the aforementioned directions is provided by a control system which includes foot actuated pedals 44 and 46, connecting rods 49 and 51, bellcranks 54 and 56, tension springs 52 and 53, a cross member 39, and a J-shaped arm 38. These parts are assembled so that activation of the forward belt drive means (belt 32) is made responsive to the actuation of the foot pedal 44 and activation of the reverse belt drive means (belt 33) is made responsive to the actuation of the pedal 46.

Referring specifically to FIGURE 3, the forward drive linkage interconnecting pedal 44 and idler pulley 37 may be described as follows: the pedal 44 is integrally formed with an angulated arm 47 pivotally connected to a front portion of the lawn mower 10 by a bracket 42; the outer end of arm 47 is pinned to the forward end of connecting rod 49 as shown generally at 55; the rear end of connecting rod 49 is hinged to one leg of the bellcrank 54 by pin 63; the tension spring 52 interconnects the bellcrank 54 and an outer end 45 of cross member 39; cross member 39 is swingable about pin 41 anchored to the platform 19, and has secured thereto one end of the J-shaped arm 38; and the J-shaped arm 38 has an arcuate portion 40 to which is journaled idler pulley 37. The reverse drive linkage is similarly constructed with pedal arm 48 being pivoted to a front portion of the lawn mower by bracket 43; connecting rod 51 interconnecting arm 48 and bellcrank 56 which is hinged to the chassis by pin 64; and tension spring 53 interconnecting end 50 of member 39 and bellcrank 56. As best seen in FIGURE 2, the cross member 39 has its mid-section bolted to the underside of platform 19 and the outer ends 45 and 50, respectively, extend through elongate slot 45a and 50a formed in sidewalls 21 and 22.

As shown in FIGURE 5, the bellcrank 54 is attached to a forward section of sidewall 22 by means of a bolt 59. The bellcrank 54 is pivotable about the bolt 59 in response to a forward force applied by connecting rod 49. A member 75 has an upper slant surface 76 aligned with the leading edge of the bellcrank 54 and a lower end 78 anchored in an opening 77 formed in sidewall 22. A torsion spring 72 having one arm 73 in engagement with the slant surface 76 and the forward edge of bellcrank 54 and another arm 74 in engagement with the lower end 78 of member 75 provides the means for maintaining the bellcrank, and hence the control system, in its normal position. The torsion spring 72 is pre-loaded to oppose forward movement of the bellcrank 54. With the bellcrank 54 in its home position the forward edge of bellcrank 54 is in alignment with the upper slant surface 76 which absorbs the pre-load force of spring 72.

The forward end of tension spring 52 is secured to the bellcrank 54 by bolt and nut assembly 67. The bellcrank 54 may be considered as having its fulcrum at 59 and legs denoted as 70 and 71, the outer ends of which are attached, respectively, to the connecting rod 49 and tension spring 52.

In order to prevent reaction of one pedal, e.g. 44, to actuation of the other pedal, e.g. 46, the connection points of the connecting rod 49 and spring 52 to the bellcrank legs 70 and 71 are particularly situated relative to the fulcrum 59 to provide for a lost-motion connection (see FIG. 3). Actuation of pedal 46 imparts motion through the connecting linkage comprising parts 51, 56, 53, 39, 52 to the bellcrank 54. Counterclockwise movement of the bellcrank 54 about pivot point 59 produces a horizontal linear component of movement to pin connection 63 (see FIG. 1). The linear component of movement of pin 63 is only a fraction of the movement of cross member end 45. The linear horizontal component indicated by letter $l_1$ is transmitted through the connecting rod 49 to the pedal 44 and is substantially less than movement of cross member end 45 indicated by letter $l_2$.

The relative locations of the pin connections 63 and 67 on the bellcrank 54 also results in a mechanical advantage in the linkage. For example, the moment arm of connecting rod 49 is very small in the normal position of the control system. However, actuation of the pedal 44 increases the moment arm of the input force member (rod 49) while the moment arm of the output member (spring 52) decreases.

It should be pointed out that the construction of the reverse drive linkage comprising bellcrank 56, rod 51, and spring 53 is identical to that of the forward drive linkage, and that the assemblage and operating characteristics, e.g. lost-motion connection and the mechanical advantage feature, are also provided therein.

The connecting springs 52 and 53 are pre-loaded to yield at a force of approximately 60 pounds. The yieldability of springs 52 and 53 insure that a constant belt tension will be maintained on the belts 32 an 33 at all times. This particular feature also minimizes the effect of belt wear or deformation. For example, a new belt will require less movement of the pulley 37 to provide the proper drive tension of the belts 32 or 33. Additional movement by the linkage is absorbed by the spring 52 or 53. However, as the belts 32 and 33 become worn or stretched, more and more of the linkage movement is transmitted to the pulley 37 and a corresponding lesser amount of movement is absorbed by the spring 52.

Summarizing the drive means, an idler pulley 37 mounted on a shifter assembly (arm 38 and member 39) is interposed between the forward drive belt 32 and the reverse drive belt 33; a reverse drive linkage (spring 53, bellcrank 56, rod 51, and arm 43) interconnects the shifter assembly and the actuator pedal 46; and a forward drive linkage (spring 52, bellcrank 54, rod 49, and arm 47) interconnects the shifter assembly and the forward drive pedal 44. The biasing force of the torsion springs 72, 72 of each bellcrank 54, 56 acting at equidistantly spaced points from pivot 41 on cross member 39 maintains the idler pulley 37 in a neutral position wherein neither of the belts 32 or 33 are tensioned.

The operation of the riding mower 10 constructed in accordance with the principles of this invention will be described with reference to FIGURES 3 and 4. Assuming that it is desired to drive the mower 10 in a forward direction, the pedal 44 is depressed pivoting arm 47 about bracket 42. Force is transmitted to the bellcrank 54 through connecting rod 49 and thence to the cross member 39 through tension spring 52. The cross member 39 pivoting about pin connection 41 moves the J-shaped bracket 38 clockwise as viewed in FIGURE 4. The idler pulley 37 is thusly moved from the neutral position (solid line position of FIGURE 4) to the forward drive position (broken line position of FIGURE 4) wherein the tension of belt 32 is increased to transmit power from the driveshaft 23 to the input shaft 36. It should be noted that deformation of the belt 32 to attain the proper belt tension is variable and dependent upon belt condition, and that the spring 52 provides for a constant pressure on the belt 32 by pulley 37. Because of the lost-motion characteristic of the bellcrank 54, reaction movement of pedal 46 is reduced.

Now assuming that it is desired to reverse the direction of travel, pedal 46 is depressed which may follow release of pedal 44 or be concurrent therewith. Through the linkage comprising connecting rod 51, bellcrank 56, tension spring 53, cross member 39, and J-shaped member 38, the pulley 37 is instantly pulled from the forward driving position, through the neutral position, to the reverse drive position (dotted line position) wherein the pulley 37 engages belt 33 imparting sufficient pressure thereon to transmit power from the camshaft 24 to the input shaft 36 of the transmission 13. Now if it is desired to stop the vehicle both pedals 44 and 46 are released causing pulley 37 to return to the neutral position. The vehicle is stopped through the dynamic braking action of the transmission.

Although the preferred embodiment of this invention has been described in particular detail, it should be emphasized that variations and modifications may be made therein without departing from the scope and spirit of the invention.

What is claimed is:

1. In a self-propelled lawn mower of the type having, rotary cutting means, a first belt drive means for driving said lawn mower in a forward direction and a second belt drive means for driving said lawn mower in a reverse direction, the improvement for selectively actuating said drive means, said improvement comprising: a chassis; a frame movably attached to said chassis; an idler pulley mounted on said frame and cooperatively arranged to actuate said first drive means attendant to movement of said frame in a first direction, and to actuate said second drive means attendant to movement of said frame in a second direction; means for maintaining said idler pulley in a neutral position; a first linkage connected to said frame and having a first lever disposed for manual operation for moving said frame in said first direction whereby said vehicle is driven in a forward direction; and a second linkage connected to said frame and having a second lever disposed for alternative manual operation for moving said frame in said second direction whereby said vehicle is driven in a reverse direction, said first and second levers being selectively actuable, and each first and second linkage including means serving as a spring providing a resilient strut to impose a spring bias on the idler pulley upon actuation of the associated linkage.

2. In a self-propelled lawn mower of the type having, rotary cutting means, a first belt drive means for driving said lawn mower in a forward direction and a second belt drive means for driving said lawn mower in a reverse direction, the improvement for selectively actuating said drive means, said improvement comprising: a chassis; a frame movably attached to said chassis; an idler pulley mounted on said frame and cooperatively arranged to actuate said first drive means attendant to movement of said frame in a first direction, and to actuate said second drive means attendant to movement of said frame in a second direction; means for maintaining said idler pulley in a neutral position; a first linkage connected to said frame and having a first lever disposed for manual operation for moving said frame in said first direction whereby said vehicle is driven in a forward direction; and a second linkage connected to said frame and having a second lever disposed for manual operation for moving said frame in said second direction whereby said vehicle is driven in a reverse direction, said first and second levers being selectively actuable, and said frame includes a member extending transversely across said chassis and having its outer ends connected to said first and second linkages, and an intermediate portion hinged to said chassis whereby movement of one of said linkages in one direction pivots said member about said hinge connection thereby imparting movement in an opposite direction to the other of said linkages, each of said linkages including lost-motion means for deamplifying movement of one of said linkages in response to movement of the other of said linkages.

3. The invention as recited in claim 2 wherein said first and second linkages are disposed on opposite sides of said chassis, said first and second levers include first and second foot pedals, respectively, said foot pedals being laterally spaced and pivotally mounted on a forward end of said chassis, and said transverse member is hinged to the rear of said chassis, said foot pedals being selectively depressable for activating either of said drive means.

4. The invention as recited in claim 2 wherein each of said lost-motion means comprises a bellcrank having a fulcrum hinged to said chassis, first arm connected to a connecting rod and a second arm connected to said transverse member, each of said levers being operative to impart forward angular movement to its associated bellcrank, said first arm being positioned to provide for a greater forward linear displacement of said connecting rod in response to forward angular displacement of said bellcrank than a rearward linear displacement of said connecting rod in response to a corresponding rearward angular displacement of said bellcrank whereby reaction of one of said levers to actuation of the other of said levers is deamplified.

5. The invention as recited in claim 4 wherein said first arm is positioned generally over said fulcrum, said second arm is positioned generally rearwardly of said fulcrum, and said first and second arms define an acute angle.

6. In a self-propelled lawn mower of the type having, rotary cutting means, a first belt drive means for driving said lawn mower in a forward direction and a second belt drive means for driving said lawn mower in a reverse direction, the improvement for selectively actuating said drive means, said improvement comprising: a chassis; a frame movably attached to said chassis; an idler pulley mounted on said frame and cooperatively arranged to actuate said first drive means attendant to movement of said frame in a first direction, and to actuate said second drive means attendant to movement of said frame in a second direction; means for maintaining said idler pulley in a neutral position; a first linkage connected to said frame and having a first lever disposed for manual operation for moving said frame in said first direction whereby said vehicle is driven in a forward direction; and a second linkage connected to said frame and having a second lever disposed for manual operation for moving said frame in said second direction whereby said vehicle is driven in a reverse direction, said first and second levers being selectively actuable, and each of said linkages include a bellcrank having its fulcrum pivotally attached to said chassis, a connecting rod interconnecting said bellcrank and said lever, means interconnecting said frame and said bellcrank, said bellcrank being positioned to provide a mechanical advantage which varies in proportion to angular displacement of said bellcrank about its fulcrum attendant to actuation of its associated lever.

7. The invention as recited in claim 6 wherein each of said bellcranks include a first arm having an outer end positioned generally above said fulcrum, a second arm having an outer end positioned rearwardly and above said fulcrum, said interconnecting means being pinned to said outer end of said first arm and extending generally rearwardly therefrom, said connecting rod being pinned to said outer end of said second arm and extending generally forwardly therefrom, said lever being actuable to impart forward angular movement to said bellcrank about said fulcrum whereby the mechanical advantage of said bellcrank increases in proportion to its forward angular displacement.

8. The invention as recited in claim 6 wherein each of said means interconnecting said bellcrank and said frame comprises a tension spring, said tension spring being preset to yield after a predetermined pressure is exerted on said belt drive means by said idler pulley.

9. A self-propelled, riding lawn mower comprising: a chassis; an engine mounted on said chassis, said engine having a driveshaft pulley and a camshaft pulley; a transmission drivingly connected to the driving wheels of said lawn mower, said transmission having an input shaft, and an input shaft pulley mounted thereon; a first endless belt trained about said driveshaft pulley and said input shaft pulley for driving said input shaft pulley in one direction; a second endless belt trained about said camshaft pulley and said input shaft pulley for driving said input shaft pulley in a reverse direction, said endless belts being orbital in substantially horizontal planes; an idler pulley interposed between said first and second belts, and movable laterally in a first direction to increase belt tension in said first belt for transmitting power from said driveshaft to said input shaft whereby said lawn mower is driven in a first direction, and movable laterally in an opposite direction to increase belt tension in said second belt for transmitting power from said camshaft to said input shaft whertby said lawn mower is driven in a reverse direction; a first foot pedal mounted on said chassis for pivotal movement; a first linkage interconnecting said first foot pedal and said idler pulley and adapted to move said idler pulley in said first direction in response to pivotal movement of said first foot pedal; a second foot pedal mounted for pivotal movement on said chassis; and a second linkage interconnecting said second foot pedal and said idler pulley and adapted to move said idler pulley in said opposite direction in response to pivotal movement of said second foot pedal.

References Cited

UNITED STATES PATENTS

| 2,445,797 | 7/1948 | Moore | 180—19 |
| 3,003,574 | 10/1961 | Strunk | 180—70 |

A. HARRY LEVY, Primary Examiner

U.S. Cl. X.R.

74—220